United States Patent
Bahr et al.

(10) Patent No.: US 7,801,097 B2
(45) Date of Patent: Sep. 21, 2010

(54) SETTING UP OF A WIRELESS NETWORK BY DETERMINING AND UTILIZING LOCAL TOPOLOGY INFORMATION

(75) Inventors: Michael Bahr, München (DE); Matthias Kutschenreuter, München (DE)

(73) Assignee: Siemens Aktiengesellschaft, Munich (DE)

(*) Notice: Subject to any disclaimer, the term of this patent is extended or adjusted under 35 U.S.C. 154(b) by 770 days.

(21) Appl. No.: 11/660,556

(22) PCT Filed: Aug. 3, 2005

(86) PCT No.: PCT/EP2005/053794
§ 371 (c)(1), (2), (4) Date: Feb. 20, 2007

(87) PCT Pub. No.: WO2006/018383
PCT Pub. Date: Feb. 23, 2006

(65) Prior Publication Data
US 2007/0263638 A1    Nov. 15, 2007

(30) Foreign Application Priority Data
Aug. 18, 2004   (DE) .................. 10 2004 040 070

(51) Int. Cl.
   *H04W 4/00*   (2009.01)
(52) U.S. Cl. .................. 370/338; 370/254; 370/406
(58) Field of Classification Search ............. 370/338, 370/254–256, 406
See application file for complete search history.

(56) References Cited

U.S. PATENT DOCUMENTS

| | | | |
|---|---|---|---|
| 6,026,297 A * | 2/2000 | Haartsen | 455/426.1 |
| 6,418,299 B1 * | 7/2002 | Ramanathan | 455/7 |
| 6,493,759 B1 * | 12/2002 | Passman et al. | 709/227 |
| 6,829,222 B2 * | 12/2004 | Amis et al. | 370/238 |
| 6,876,643 B1 * | 4/2005 | Aggarwal et al. | 370/338 |
| 6,985,740 B2 * | 1/2006 | Shyy et al. | 455/453 |
| 7,171,476 B2 * | 1/2007 | Maeda et al. | 709/227 |
| 7,184,767 B2 * | 2/2007 | Gandolfo | 455/435.2 |

(Continued)

OTHER PUBLICATIONS

Chiara Petriolo et al., Configuring BlueStars: Multihop Scatternet Formation for Bluetooth Networks, IEEE Transactions on Computers, vol. 52, No. 6, Jun. 2003.*

(Continued)

*Primary Examiner*—Kent Chang
*Assistant Examiner*—Magdi Elhag
(74) *Attorney, Agent, or Firm*—Staas & Halsey LLP

(57) ABSTRACT

When setting up a wireless network formed of several communication terminals, it is usual for the communication terminals to be devoid of information on local topology. In large wireless mobile environment networks it is advisable to create an independent large-network setup, wherein individual communication terminals which are not yet connected and/or partial networks are integrated. The method enables automatic dynamic, large-network organization, taking into account communication terminals which are not yet connected. This is achieved by exchanging messages between the communication devices to determine local topology information independently and by integrating the thus enhanced isolated individual communication terminals and partial networks.

8 Claims, 3 Drawing Sheets

U.S. PATENT DOCUMENTS

| | | | | |
|---|---|---|---|---|
| 7,532,594 | B2 * | 5/2009 | Lin et al. | 370/329 |
| 2002/0018448 | A1 * | 2/2002 | Amis et al. | 370/255 |
| 2002/0044549 | A1 | 4/2002 | Johansson et al. | |
| 2003/0149794 | A1 * | 8/2003 | Morris et al. | 709/249 |
| 2003/0202477 | A1 * | 10/2003 | Zhen et al. | 370/248 |
| 2003/0224787 | A1 | 12/2003 | Gandolfo | |
| 2005/0180343 | A1 * | 8/2005 | Van Valkenburg | 370/310 |
| 2006/0052125 | A1 * | 3/2006 | Falck et al. | 455/517 |
| 2006/0089119 | A1 * | 4/2006 | Lipasti et al. | 455/410 |

OTHER PUBLICATIONS

Petrioli et al.; "Configuring BlueStars: Multihop Scatternet Formation for Bluetooth Networks"; IEEE Transactions on Computers, vol. 52, No. 6, Jun. 2003; pp. 1-36.

Salonidis et al.; "Distributed Topology Construction of Bluetooth Personal Area Networks"; Proceedings of IEEE Infocom 2001; vol. 3; Apr. 2001; pp. 1577-1586.

Specification of the Bluetooth System, Covered Core Package Version 1.2, Nov. 2003.

Beutel et al.; "BTnode Project Page"; printed Aug. 17, 2004 from www.tik.ee.ethz.ch/~beutel/bt_node.html; pp. 1-3.

Beutel et al.; "BTnode rev2_2 Design Data"; printed Aug. 17, 2004 from www.tik.ee.ethz.ch/~beutel/projects/btnode/bt_node2_2.html; pp. 1-3.

Kasten et al.; "BTnode rev2_2"; printed Aug. 17, 2004 from www.vs.inf.ethz.ch/res/proj/smart-its/btnode.html; pp. 1-8.

Zusman et al.; "Routing in BlueTooth ScatterNet"; printed Aug. 17, 2004 from comnet.technion.ac.il/~cn9w02;pp.1-3 & 1-50.

International Search Report for International Application No. PCT/EP2005/053794; mailed Dec. 5, 2005.

* cited by examiner

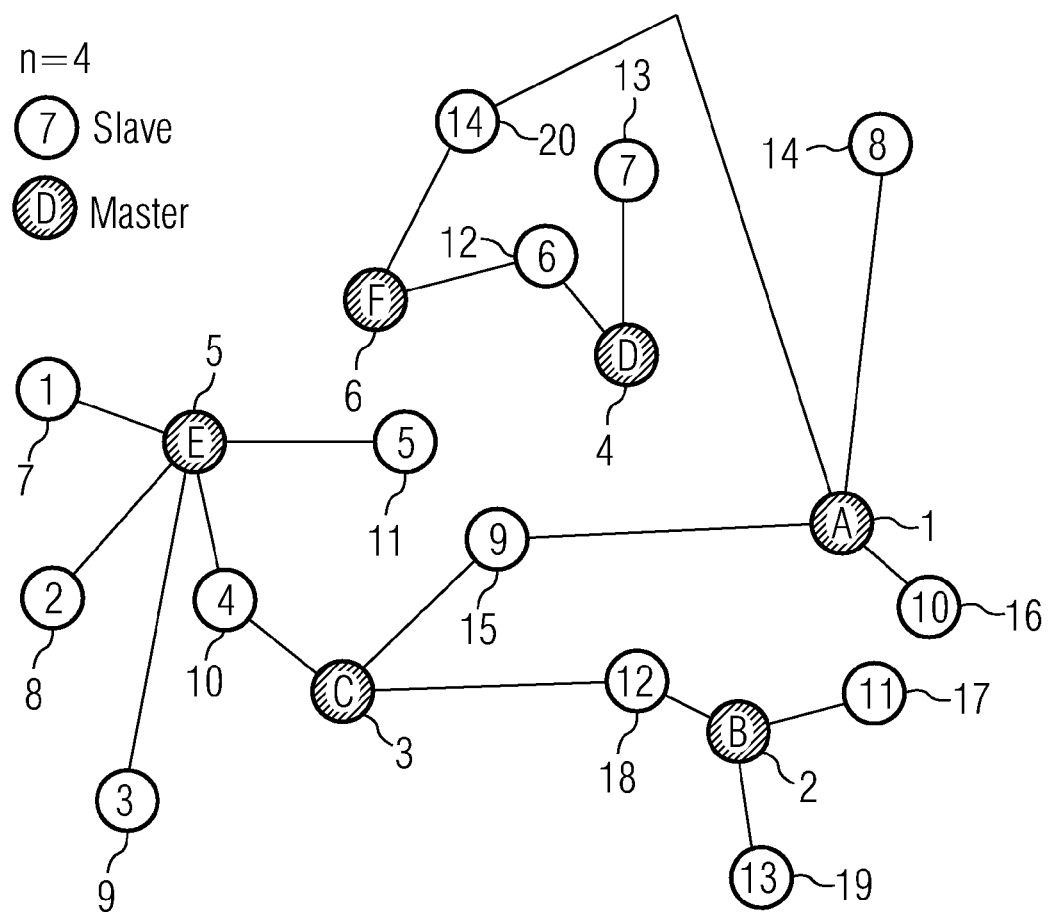

SETTING UP OF A WIRELESS NETWORK BY DETERMINING AND UTILIZING LOCAL TOPOLOGY INFORMATION

CROSS REFERENCE TO RELATED APPLICATIONS

This application is based on and hereby claims priority to German Application No. 10 2004 040 070.9 filed on Aug. 18, 2004, the contents of which are hereby incorporated by reference.

BACKGROUND

Described below is a method for setting up a non-wired network by determining and utilizing local topology information.

The wire-based network topology for transmitting data between a plurality of communication devices is associated with loss of mobility and therefore loss of convenience. By contrast, network technology which is not wire-based allows data to be transmitted over short distances without being subject to limitations in terms of mobility. In addition to this, the communication devices can connect spontaneously and autonomously.

In a first method, a first communication device initially receives a list specifying the further communication devices to which it can connect. By advancing progressively through the list or by manual manipulation, the first communication device decides which further communication device it should ask to set up a connection.

In a second method (Specification of the Bluetooth System, Version 1.2, Core) for setting up a non-wired network, a distinction relating to communication devices is made between a communication control device which is responsible for the control of the communication and a communication device which is controlled by the communication control device. Two communication control devices or two controlled communication devices cannot generally connect to each other. The number of communication devices which can be controlled by a communication control device can be limited by technical and/or administrative measures. If a communication control device can only control a limited number of communication devices, this means that the size of a network is restricted by the subscriber capacity of its communication control device. A larger number of communication devices can be achieved by combining individual networks to form a larger overall network. There are two possibilities for creating the required bridge connection between two communication control devices. One possibility is for a device to function as a communication control device in the first network and as a controlled communication device in the second network. Another possibility is to connect two communication control devices via a controlled communication device. Various network topologies can be obtained in this context, e.g. tree-type, chain-type or mesh-type topologies.

In one implementation of a non-wired network according to the second method at the Technion-Israel Institute of Technology in Haifa, information indicating whether it is to operate as a communication control device or as a controlled communication device is required from each device when it starts. Various topologies can then be generated on the basis of the positioning and the sequence in which the devices are switched on (www-comnet.technion.ac.il/~cn9w02). Such a network having a tree topology has been set up at the ETH in Zurich (www.tik.ee.ethz.ch/~beutel/bt_node.html). The formation algorithm is not known in greater detail.

This method has a disadvantage in that no information concerning the local topology of the network is available to a communication device desiring to set up a connection. As a consequence, it is possible that an individual communication device or whole subnetworks are not integrated into the overall network. Furthermore, the setup of a network can only be achieved statically and therefore does not satisfy the dynamic requirements in the case of non-wired transmission involving a plurality of communication devices.

The problem addressed is that of specifying a method by which an overall network formed by a plurality of communication devices can organize itself, and individual communication devices and/or subnetworks which are not yet connected are included when this network is set up.

An essential aspect is the determining of the local topology information. In accordance with the method described below, this is achieved by a message exchange between the communication devices. To this end, a first communication device sends a query message containing a list of identification codes of further communication devices, to which a connection can be set up, to second communication devices which are connected to the first communication device. At least one second communication device, wherein a connection exists between the second communication device and one of the further communication devices identified in the query message and/or wherein the second communication device is itself a communication device identified in the query message, sends a reply message to the first communication device. From the reply message, it is possible to determine the identification codes of the further communication devices which are connected to the second communication device and/or to extract the identification code of the second communication device if this is itself a communication device identified in the query message.

The first communication device requests the setting up of a connection to at least one further communication device which is identified in the query message and to which no connection exists from a second communication device. A successful request results in a connection setup.

Without restricting the generality of this term, communication devices are understood to include PCs and computer peripheral devices, mobile devices (laptops, handheld PCs, PDAs), telecommunication devices (mobile phones, ISDN installations), video and TV devices, audio devices and domestic appliances (washing machines, refrigerators), for example. These devices can be networked using IrDA, Bluetooth or WLAN modules, for example.

SUMMARY

In accordance with a further advantageous embodiment, the identification codes of the further communication devices which are identified in the query message and connected to the second communication device are listed in the reply message of the second communication device and/or the identification code of the second communication device is listed if the latter is itself a communication device from the query message. This requires less storage space and therefore ensures a faster and more efficient message exchange.

The mesh size of a non-wired network is advantageously adjusted by a step size for the message exchange, wherein the step size defines the number of communication devices via which a query message is sent within a network topology. A mesh-type topology of the network emerges in this context.

The bigger the step size, the coarser the mesh of the overall network. Mesh-type topologies have the advantage that they are less susceptible to failure than other topologies such as tree-type or chain-type topologies. If one route in a network fails, the option of a second possible route still remains. In the event of a failure of a device or a subnetwork, it is usually possible already to repair the overall network after the next message exchange of a participating communication device. An additional advantage of a mesh-type topology is the faster routing of data. As a result of the multiple possible routes for a connection between two devices, a smaller traffic load is produced on individual devices/routes. Furthermore, the routes between two devices are usually shorter as a result of meshing than in the case of a chain topology, for example.

According to an advantageous development, the local topology information is determined by a message exchange between the communication control devices.

A first communication control device sends a query message containing a list of identification codes of further communication devices, to which a connection can be set up, via a communication device which is controlled by a communication control device, to second communication control devices which are connected to the controlled communication device. At least one second communication control device, wherein a connection exists between the second communication control device and one of the further communication devices identified in the query message and/or wherein the second communication control device is itself a communication device identified in the query message, sends a reply message to the first communication control device. From the reply message, it is possible to determine the identification codes of the further communication devices which are connected to the second communication control device and/or to extract the identification code of the second communication control device if this is itself a communication device identified in the query message.

The first communication control device requests the setting up of a connection to at least one further communication device which is identified in the query message and to which no connection exists from a second communication control device. A successful request results in a connection setup.

Without restricting the generality of this term, communication control devices are understood to include a master device in accordance with the Bluetooth communication protocol or a primary station in accordance with the IrDA protocol. Consequently, a controlled communication device corresponds to a slave device in accordance with the Bluetooth protocol and to a secondary station in accordance with the IrDA protocol.

BRIEF DESCRIPTION OF THE DRAWINGS

These and other objects and advantages will become more apparent and more readily appreciated from the following description of an exemplary embodiment, taken in conjunction with the accompanying drawings of which:

FIG. 3 is a schematic illustration of the network topology from FIG. 1 after execution of the algorithm using the step size n=4.

DETAILED DESCRIPTION OF THE PREFERRED EMBODIMENT

Figure 1:
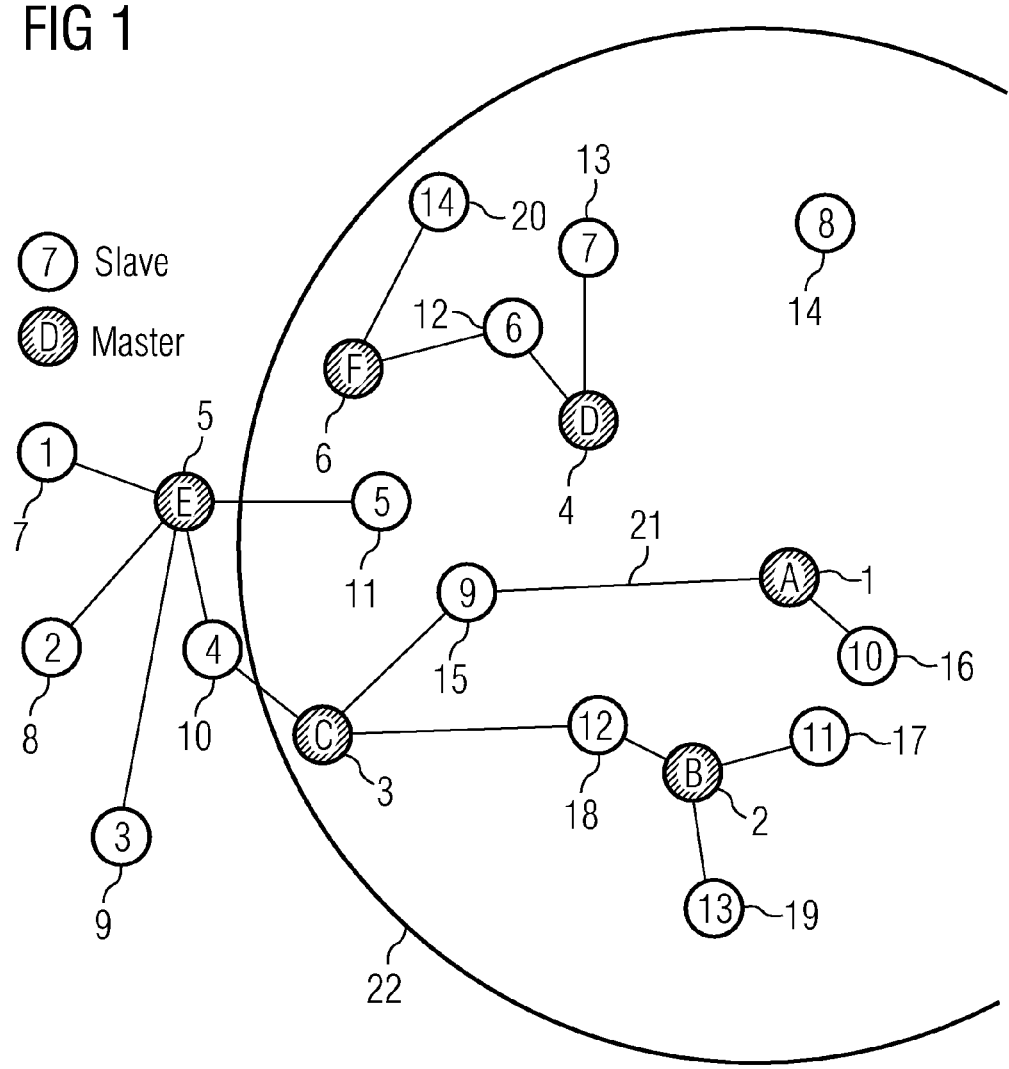
FIG. 1 is a schematic illustration of an exemplary network topology with a plurality of communication control devices and controlled communication devices.

Reference will now be made in detail to the preferred embodiments, examples of which are illustrated in the accompanying drawings, wherein like reference numerals refer to like elements throughout.

Figure 2:
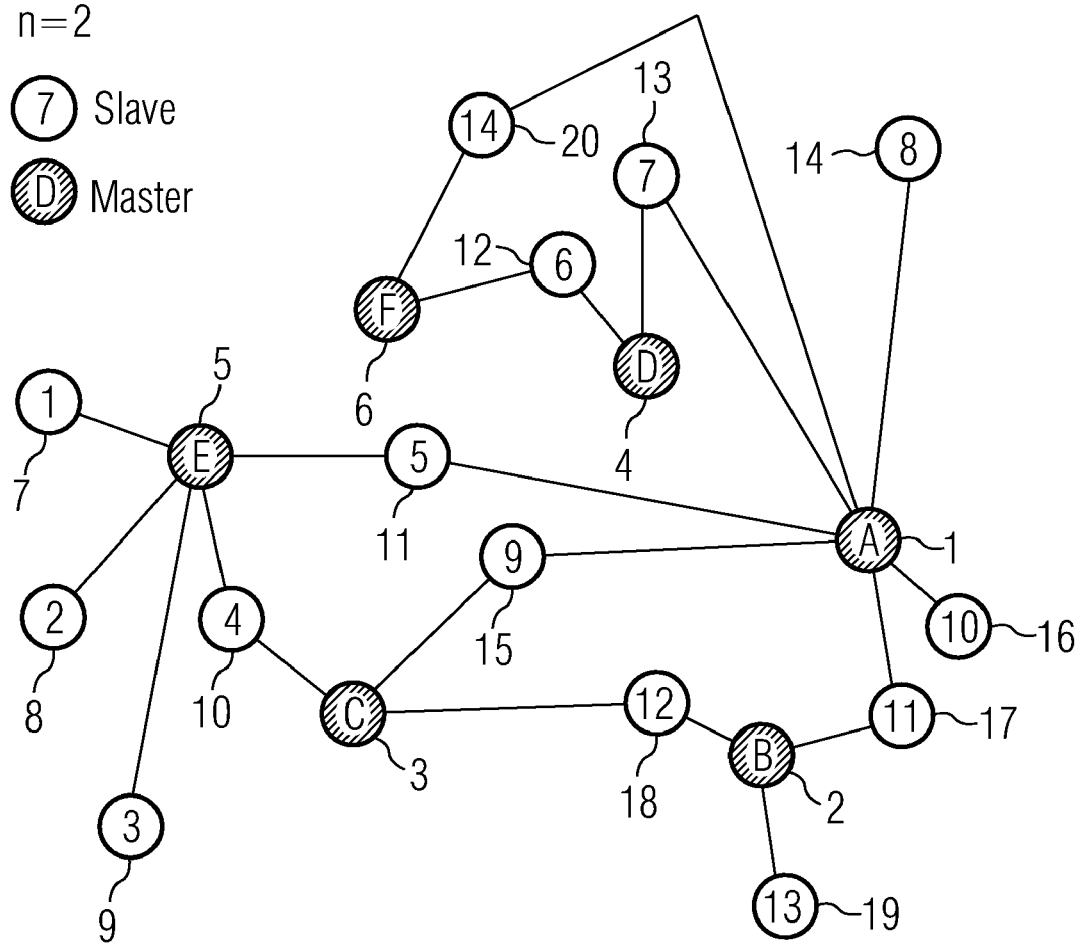
FIG. 2 is a schematic illustration of the network topology from FIG. 1 after execution of the algorithm using the step size n=2.

In the FIGS. 1-3, the six black colored circles symbolize the communication control devices and the fourteen white colored circles symbolize the controlled communication devices. In this configuration, it is not possible for two communication control devices or two controlled communication devices to connect to each other directly. A connection between two communication control devices is only possible via a communication device which, in this exemplary embodiment, can be connected to a maximum of two communication control devices. In general, it is possible to extend the number of communication control devices which can be connected via a controlled communication device. In the following exemplary embodiment, the controlled communication devices are designated simply as communication devices. The term devices is used as a generic term for communication control devices and controlled communication devices.

FIG. 1 shows a subnetwork with four communication control devices 1, 2, 3, 5 and ten communication devices 7, 8, 9, 10, 11, 15, 16, 17, 18, 19, a subnetwork which is not connected to this and includes two communication control devices 4, 6 and three communication devices 12, 13, 20, and one individual communication device 14. The drawn partial circle 22 graphically illustrates the transmission range of the communication control device 1. An unbroken line 21 symbolizes an existing connection between the devices, the example for the line 21 being a connection between the communication control device 1 and the communication device 15.

First, the communication control device 1 receives a list containing the identification codes of the devices 14, 16, 17, 19, 2, 18, 3, 15, 11, 4, 6, 12, 20, 13 within its transmission range. The communication control device 1 firstly removes the identification codes of the communication devices 15 and 16, to which it is directly connected, from its list, which therefore contains the identification codes of the devices 14, 17, 19, 2, 18, 3, 11, 4, 6, 12, 20, 13.

The execution of the algorithm is considered once using the step size n=2 and once using the step size n=4.

n=2:

After the communication control device 1 has sent the list to the communication control devices which are connected to it within the step size n=2, it receives the reply message identifying the devices 3, 18 from the communication control device 3. Following receipt of the message, the communication control device 1 deletes the identification codes cited in the reply message from its list, which consequently contains the identification codes of the devices 14, 17, 19, 2, 11, 4, 6, 12, 20, 13.

The communication control device 1 successfully sets up a connection to communication device 14. A new query message is now generated containing the identification codes of the devices 17, 19, 2, 11, 4, 6, 12, 20, 13. There is no reply message in the present example, because the communication device 14 does not have a connection to any communication control device other than communication control device 1.

The communication control device 1 now sets up a connection to communication device 17, which is also successful. A new query message containing the identification codes of the following devices 19, 2, 11, 4, 6, 12, 20, 13 is now generated and sent. The communication control device 1 receives a reply message containing the identification codes of the devices 2, 19 from the communication control device 2. Following receipt of the message, the communication control device 1 deletes the identification codes cited in the reply message from its list, which consequently contains the identification codes of the devices 11, 4, 6, 12, 20, 13.

The communication control device 1 successfully sets up a connection to communication device 11. A new query message containing the identification codes of the devices 4, 6, 12, 20, 13 is now generated and sent. Although the communication device 11 is connected to the communication control device 5, the communication control device 1 does not receive a reply message from the communication control device 5 because none of the devices known to the communication control device 5 is included in the query message.

The communication control device 1 now attempts to set up a connection to the communication control device 4, but this fails because the communication control device 4 is itself a communication control device. The communication control device 4 is deleted from the list. The attempt to set up a connection to the communication control device 6 fails for the same reason. The communication control device 6 is deleted from the list. The connection setup to the communication device 12 likewise fails because the communication device 12 is already connected to two communication control devices. The communication device 12 is deleted from the list.

The communication control device 1 successfully sets up a connection to the communication device 20. A query message containing the identification code of the communication device 13 is now generated and sent. Although the communication device 13 is connected to the communication control device 6, the communication control device 1 does not receive a reply message from the communication control device 6, because the communication control device 1 did not request a device to which the communication control device 6 is directly connected or which the communication control device 6 itself is.

The communication control device 1 successfully sets up a connection to the communication device 13. Communication device 13 is deleted from the list, which is consequently empty. The execution of the algorithm is therefore complete.

FIG. 2 shows the network topology from FIG. 1 after the above-described algorithm using the step size n=2 has been executed. It is clear that the individual communication device 14 and the subnetwork including the devices 4, 6, 12, 13, 20 have been integrated into the network by the communication control device 1.

n=4:

After the communication control device 1 has sent the list to the communication control devices which are connected to it within the step size n=4, it receives the reply message containing the identification codes of the devices 3, 18 from the communication control device 3, the reply message containing the identification codes of the devices 2, 18, 17, 19 from the communication control device 2, and the reply message containing the identification code of the communication device 11 from the communication control device 5. Following receipt of the message, the communication control device 1 deletes the identification codes cited in the reply message from its list, which consequently contains the identification codes of the devices 14, 4, 6, 12, 20, 13.

The communication control device 1 successfully sets up a connection to communication device 14. A new query message containing the identification codes of the following devices 4, 6, 12, 20, 13 is now generated. There is no reply message, because the communication device 14 does not have a connection to any communication control device other than communication control device 1.

The communication control device 1 now attempts to set up a connection to the communication control device 4, but this fails because the communication control device 4 is itself a communication control device. The communication control device 4 is deleted from the list. The attempt to set up a connection to the communication control device 6 fails for the same reason. The communication control device 6 is deleted from the list. The connection setup to the communication device 12 likewise fails because the communication device 12 is already connected to two communication control devices. The communication device 12 is deleted from the list.

The communication control device 1 successfully sets up a connection to the communication device 20. A query message containing the identification code of the communication device 13 is now generated and sent. Because the communication device 20 is connected to the communication control device 6 and because the step size n=4, whereby the communication control device 4 is also reached, communication control device 1 receives the reply message containing the identification code of the communication device 13 from the communication control device 4. Communication device 13 is deleted from the list, which is consequently empty. The execution of the algorithm is therefore complete.

FIG. 3 shows the network topology from FIG. 1 after the above-described algorithm using the step size n=2 has been executed. It is clear that the individual communication device 14 and the subnetwork including the devices 4, 6, 12, 13, 20 have been integrated into the network by the communication control device 1. In comparison with FIG. 2, it is also clear that a more coarsely meshed topology is produced by the algorithm using the larger step size n=4.

A description has been provided with particular reference to the exemplary embodiments and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method for setting up a wireless network, comprising:
sending, from a first communication device to second communication devices wirelessly connected to the first communication device, a query message containing a list of identification codes of further communication devices within a transmission range of the first communication device, to which a connection can be set up;
sending a first reply message to the first communication device from a replying second communication device when a wireless connection exists between the replying second communication device and at least one of the further communication devices identified in the query message;
sending a second reply message to the first communication device from a replying further communication device when the replying further communication device receives the query message;

determining from the first reply message the identification code of the at least one of the further communication devices identified in the query message and wirelessly connected to the replying second communication device;

extracting from the second reply message the identification code of the replying further communication device and any other further communication device wirelessly connected thereto; and requesting by the first communication device setting up of at least one wireless connection to at least one of the further communication devices which is identified in the query message and to which no connection exists from any of the second communication devices and any replying further communication device.

2. The method as claimed in claim 1, wherein the first reply message includes the identification code of each of the at least one further communication device connected to the replying second communication device, and wherein the second reply message includes the identification code of the replying further communication device and any other further communication device wirelessly connected thereto.

3. The method as claimed in claim 1, wherein the first reply message includes the identification code of each of the further communication devices not connected to the replying second communication device, and wherein the method further comprises sending a third reply message from any other communication devices receiving the query message, but not listed in the query message.

4. The method as claimed in claim 1, further comprising specifying a step size for exchange of the query and reply messages, where the step size defines a number of communication devices through which the query message passes within a network topology.

5. The method as claimed in claim 1, wherein the first communication device and the replying second and replying further communication devices are communication control devices, and wherein any connection between any pair of the communication control devices is via a non-control communication device controlled by one of the pair of the communication control devices.

6. The method as claimed in claim 5, wherein as defined in Bluetooth Core Specification Version 1.2, each communication control device corresponds to a master and each non-control communication device controlled by one of the communication control devices corresponds to a slave.

7. The method as claimed in claim 1, wherein each of the first communication device and the replying second and replying further communication devices is a master device, and wherein a connection between two masters includes a communication device functioning as both master and slave.

8. The method as claimed in claim 1, wherein the identification code is a Medium Access Control address.

* * * * *